United States Patent [19]
Zanoni et al.

[11] Patent Number: 5,768,012
[45] Date of Patent: Jun. 16, 1998

[54] APPARATUS AND METHOD FOR THE HIGH-POWER PUMPING OF FIBER OPTIC AMPLIFIERS

[75] Inventors: Raymond Zanoni; Stephen G. Grubb. both of Fremont, Calif.

[73] Assignee: SDL, Inc., San Jose, Calif.

[21] Appl. No.: 813,690

[22] Filed: Mar. 7, 1997

[51] Int. Cl.⁶ .................................................. H01S 3/00
[52] U.S. Cl. .................................................. 359/341
[58] Field of Search .................................. 359/341, 337, 359/134; 372/6

[56] References Cited

U.S. PATENT DOCUMENTS

| | | | |
|---|---|---|---|
| 5,136,420 | 8/1992 | Inagaki et al. | 359/341 |
| 5,321,708 | 6/1994 | Tohmon et al. | 372/6 |
| 5,563,732 | 10/1996 | Erdogan et al. | 359/341 |
| 5,640,268 | 6/1997 | Chesnoy | 359/341 |

*Primary Examiner*—Mark Hellner
*Attorney, Agent, or Firm*—Kudirka & Jobse, LLP

[57] ABSTRACT

An erbium/ytterbium fiber amplifier amplifying an optical signal at approximately 1550 nm is pumped by an optical signal at approximately 1060 nm generated by a grating-stabilized ytterbium fiber laser. The fiber laser energy is output along a first optical path, which is coupled to the fiber amplifier coil via a WDM coupler. An optical attenuator is located in the optical path between the fiber laser and the fiber amplifier coil, and attenuates optical energy in the wavelength range of 1090 nm, to prevent optical coupling in that range between the fiber laser and the fiber amplifier from destabilizing the fiber laser. In one embodiment, the optical attenuator is a narrowband WDM coupler which couples wavelengths in the selected range out of the optical path. In another embodiment, the optical attenuator is a long-period optical fiber Bragg grating which attenuates the selected wavelengths. In still another embodiment, the optical attenuator is an optical fiber coil, which has a precise radius of curvature that results in fiber bending losses for signals having wavelengths longer than 1080 nm.

25 Claims, 5 Drawing Sheets

APPARATUS AND METHOD FOR THE HIGH-POWER PUMPING OF FIBER OPTIC AMPLIFIERS

FIELD OF THE INVENTION

This invention relates generally to optical fiber amplifiers and, more particularly, to the efficient pumping of such fiber amplifiers.

BACKGROUND OF THE INVENTION

As is known in the art, an optical amplifier is a device that increases the amplitude of an input optical signal fed thereto. If the optical signal at the input to such an amplifier is monochromatic, the output will also be monochromatic, with the same frequency. A conventional fiber amplifier comprises a gain medium, such as a single mode glass fiber having core doped with a rare earth material, connected to a WDM coupler. The input signal is provided, via the coupler, to one end of the fiber. The fiber is optically pumped by optical energy generated by a pumping source, which optical pump energy is within an absorption band of the rare earth dopant. The optical pump energy is also provided to the coupler which has a low insertion loss at both the signal and pump wavelengths. The input signal is combined with the optical input signal within the coupler and introduced into the fiber core and an amplified output signal is emitted from the other end of the fiber.

Such amplifiers are typically used in a variety of applications including but not limited to amplification of weak optical pulses such as those that have traveled through a long length of optical fiber in communication systems. With appropriate doping, optical amplification can take place in a variety of materials including those materials, such as silica, from which optical fibers are formed.

One type of fiber amplifier referred to as an erbium-ytterbium (Er/Yb) amplifier typically includes a silica fiber having a single-mode core doped with erbium and with ytterbium (more specifically, the silica is doped with erbium ions conventionally denoted as $Er^{3+}$ and ytterbium ions conventionally denoted as $Yb^{3+}$). It is well known that an erbium-ytterbium optical fiber amplifier, operating in its standard "three level" mode, is capable, when pumped with an appropriate pumping wavelength, of amplifying optical signals having a wavelength of approximately 1.5 micrometers ($\mu$m). Since 1.5 $\mu$m is the lowest loss wavelength of conventional single-mode glass fibers, erbium-ytterbium amplifiers are well suited for inclusion in fiber systems that propagate optical signals having wavelengths around 1.5 $\mu$m.

An erbium-ytterbium amplifier can be pumped with a variety of pumping energy sources. One particularly advantageous pumping energy source is a cladding-pumped ytterbium (Yb) fiber laser, which is also constructed from a silica fiber core that is doped only with ytterbium ions. Such a fiber laser can be stabilized with an optical grating at the output to operate at a wavelength within the range of about 1020 nm to 1070 nm which is useful for pumping the erbium-ytterbium amplifier.

It is desirable to increase the power amplification of the Er/Yb fiber amplifier by increasing the pumping power produced by the Yb fiber laser pump source. However, when the pumping power is increased, it has been found that the power output of the Er/Yb amplifier with a constant input power does not increase linearly with an increase in pumping power. Instead, the power output increases at a less than linear rate, or saturates completely.

Accordingly, it is an object of the present invention to improve the efficiency of an Er/Yb amplifier pumped by a Yb fiber laser.

SUMMARY OF THE INVENTION

In accordance with the principles of the present invention, a wavelength selective optical component is inserted between the Er/Yb fiber amplifier and the Yb fiber laser which transmits the pumping energy wavelength produced by the Yb fiber with little or no loss, but attenuates longer wavelengths. When the attenuating optical component is inserted, the power output of the Er/Yb amplifier increases linearly with an increase in pumping power because interaction between the fiber amplifier and the fiber laser is reduced.

In a preferred embodiment of the invention, a wavelength selective directional coupler is located in an optical path between the fiber laser and the directional coupler by which the laser energy is coupled to the amplifier fiber core. The attenuating directional coupler directs wavelengths in the desired attenuation range out of the pumping energy path. In the case of a Yb fiber laser and an Er/Yb fiber amplifier, the preferred wavelength attenuation range is between approximately 1080 nm and 1120 nm. Energy in these wavelengths is coupled out of the optical path between the fiber laser and the fiber amplifier by the directional coupler.

In an alternative embodiment of the invention, the attenuating optical element is a long period fiber grating. For example, the fiber grating can be an optical fiber Bragg grating which attenuates the wavelength range between approximately 1080 nm and 1100 nm, thus reducing interaction between the fiber laser and the fiber amplifier at these wavelengths.

In still another alternative embodiment of the invention, the attenuating optical element is a fiber coil which introduces fiber bend losses at wavelengths above approximately 1080 nm. Preferably, the fiber is coiled about a mandrel which maintains the desired curvature of the fiber. The fiber bend losses of the coil result in the reduction of interaction between the fiber laser and the fiber amplifier at wavelengths within the desired attenuation wavelength range.

DETAILED DESCRIPTION OF THE PREFERRED EMBODIMENTS

Figure 1:
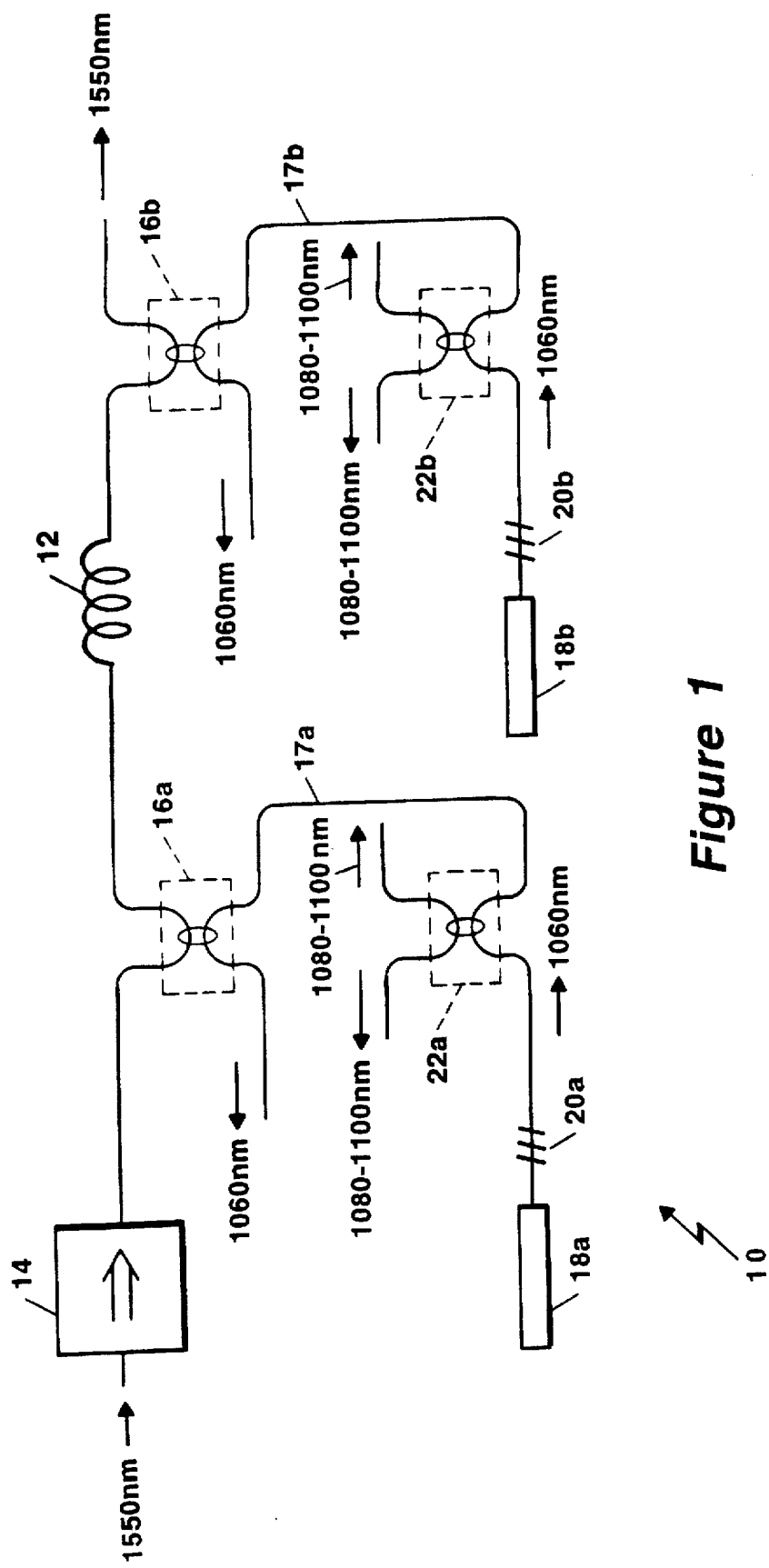
FIG. 1 is a schematic view of a fiber amplifier apparatus according to the present invention in which an attenuation directional coupler is located in an optical path between the fiber amplifier and a fiber laser which pumps the amplifier.

FIG. 1 is a schematic view of an optical signal amplification apparatus 10 which uses an Er/Yb fiber amplifier 12 which amplifies an optical input signal having a wavelength of approximately 1550 nm. As previously mentioned, 1550 nm is the lowest loss wavelength of conventional single-mode glass fibers and, thus, the amplifier is ideally suited for use in optical communications system. For example, the input optical signal may be an optical communications signal which has been attenuated from being transmitted over optical fibers for a long distance. In FIG. 1, and throughout the other figures of the application, optical paths are shown by solid lines connecting the elements of the invention. Such designation is common in the field, and is representative herein of optical fibers, preferably conventional silica-based optical fibers. Also, throughout the figures, arrows are used to indicate the primary direction of optical signals traveling through the optical paths shown, with numerical indications of the wavelengths of these signals shown adjacent to the arrows, in nanometers (nm).

Referring again to FIG. 1, the input optical signal passes first through isolator 14, which prevents transmission of the pumping energy back to the signal source. The signal then enters the fiber amplifier 12, which is pumped with laser energy from both an input side and an output side. In the present invention, the Er/Yb fiber amplifier 12 is pumped by coupling optical energy from Yb cladding pumped fiber lasers 18a and 18b into the amplifier fiber core 12 with WDM couplers 16a and 16b. The pumping energy passes along optical paths 17a and 17b. The additional couplers 22a and 22b will be discussed below.

In each of the embodiments of the present invention, the Yb fiber lasers are grating-stabilized by means of fiber Bragg gratings 20a and 20b located in the optical paths 17a and 17b between the fiber lasers 18a and 18b and the WDM couplers 16a and 16b, respectively. The gratings 20a and 20b are conventional and their construction and use is well-known. Preferably, two of these grating-stabilized fiber lasers are used to pump the amplifier coil, one at the input side of the amplifier coil and one at the output side. While each of the descriptions of the different embodiments of the invention below refer to a single fiber laser and associated attenuation and coupling elements, it will be understood by those skilled in the art that it is preferable in each of these embodiments that two fiber lasers with associated elements are used to pump the amplifier coil at both an input side and an output side.

Figure 2:
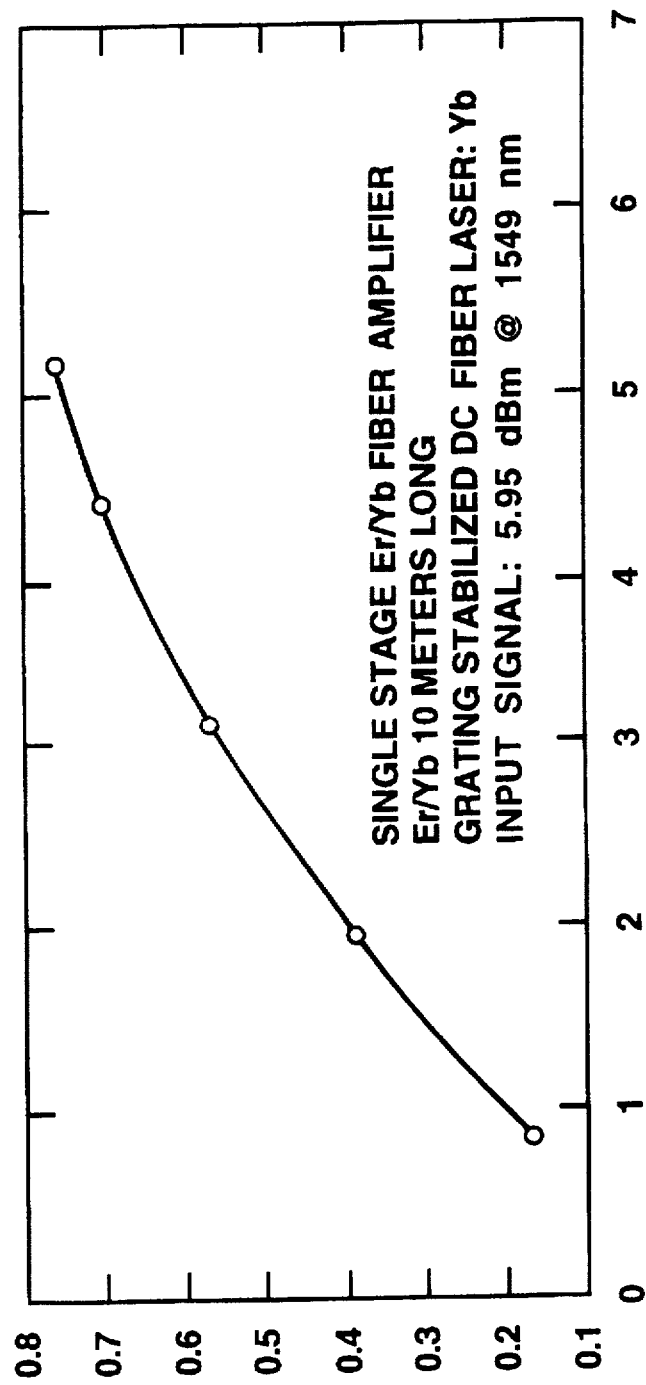
FIG. 2 is graph showing output power versus pumping power for a fiber amplifier apparatus such as that illustrated in FIG. 1.

It is desirable to increase the power amplification of an amplifier such as that shown in FIG. 1 in order to increase the amplification of the input signal. However, it has been observed that the amplification does not increase linearly with an increase in pumping power. This phenomenon is illustrated by FIG. 2 in which shows the output power versus the pumping power with a constant input signal. More specifically, FIG. 2 shows the output power of the amplifier illustrated in FIG. 1 with a constant input power of 5.95 dBm at 1549 nm. The Er/Yb amplifier is a single stage amplifier with a 10 meter fiber length. The vertical axis represents the output power in watts at 1549 nm. The horizontal axis represents the Yb pumping power in watts at 1064 nm. As can be seen in the figure, as the pumping power is increased the output power does not show a corresponding increase.

It has been discovered by the inventors of the present invention that one reason that the output power does not increase directly with an increase in the pumping power is that, at relatively high pumping powers, the Yb fiber laser pumping the Er/Yb fiber amplifier begins to lase at longer wavelengths and becomes unstable. Specifically, the pumping laser begins to generate significant power at a second laser wavelength of approximately 1084 nm. This second wavelength is not useful for pumping the Er/Yb fiber amplifier and thus the pumping power is lost.

Figure 3A:
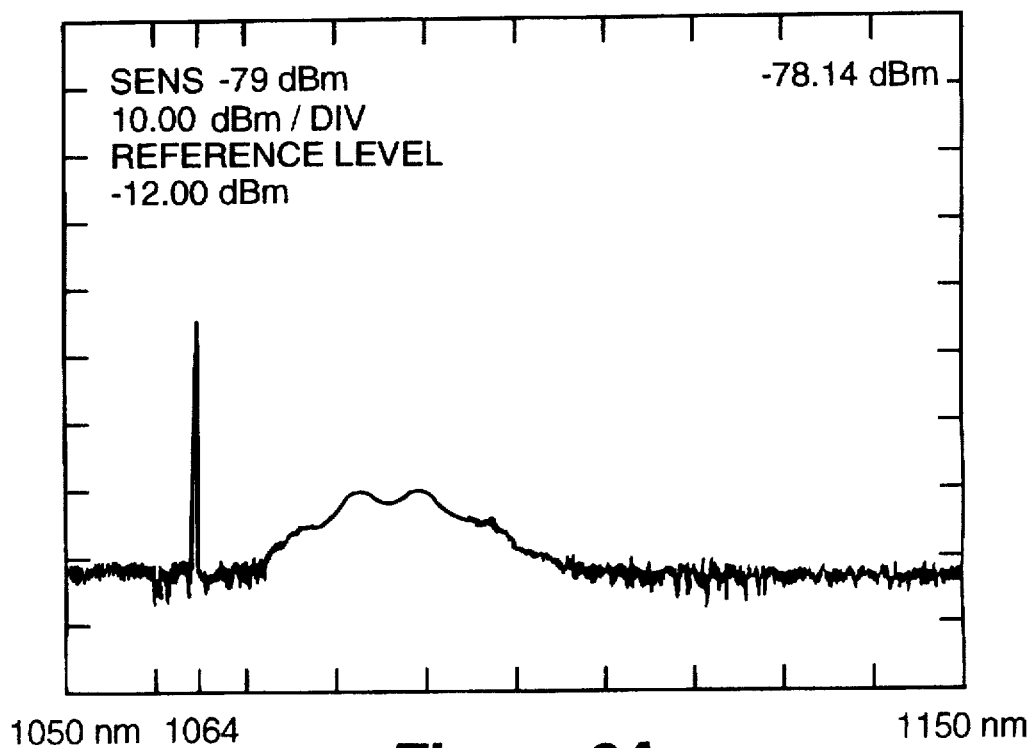
FIGS. 3A and 3B are optical spectra of the Yb fiber laser output when the laser is operating in the optical amplifying apparatus at two different power outputs.
Figure 3B:
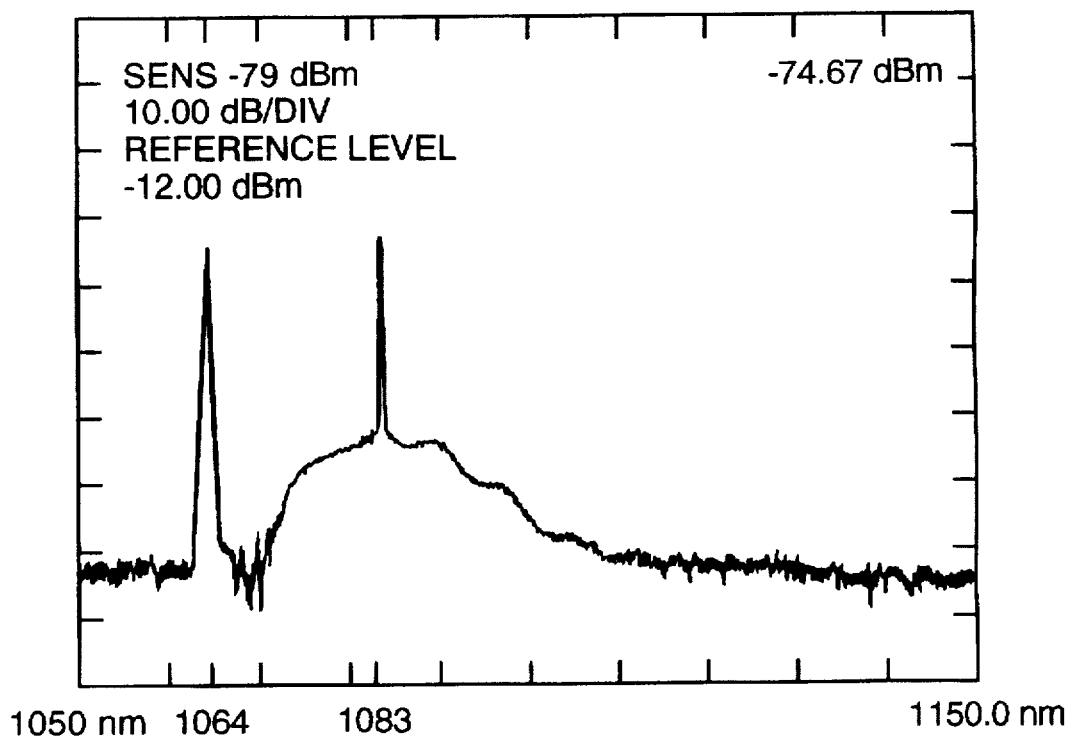

The latter phenomenon is illustrated by FIGS. 3A and 3B. FIG. 3A shows an optical spectrum of the Yb fiber laser output when the laser is coupled to an Er/Yb fiber amplifier when the fiber laser output is approximately 1 watt. The vertical axis represents output power with a reference level of −12 dBm with 10 dB/division. The horizontal axis represents output wavelength. As shown in the figure the laser is operating with an output wavelength of 1064 nm.

FIG. 3B shows an optical spectrum of the Yb fiber laser output when the laser is coupled to an Er/Yb fiber amplifier when the fiber laser output is approximately 5 watts. The vertical and horizontal axes are the same as in FIG. 3B. The Yb fiber laser is still operating at 1064 nm, but now there is a second signal at 1083 nm. This instability is attributed to an interference between the fiber amplifier and the fiber laser caused by a signal generated by the Er/Yb amplifier back propagating through the coupling to the output of the Yb fiber laser. Such a signal might, for example, be a long wavelength Yb ASE signal from the Er/Yb fiber.

To reduce the instability of the fiber lasers 18a, 18b in the apparatus of FIG. 1, a wavelength-specific optical attenuator is provided in each of the optical paths between fiber laser 18a and coupler 16a, and between fiber laser 18b and coupler 16b. In one embodiment, these optical attenuators, respectively, are narrow-band WDM coupler 22a and narrow-band WDM coupler 22b. Couplers 22a and 22b are conventional couplers which couple wavelengths within a predetermined wavelength range. Couplers 22a, 22b are each configured to couple wavelengths in the range of 1080 nm to 1100 nm. The optical energy in that wavelength range back propagating from amplifier 12 is coupled from the optical paths between the fiber lasers 18a, 18b and the directional couplers 16a, 16b into the free legs of the couplers 22a and 22b, so that the couplers 22a, 22b serve to remove optical energy in these wavelengths from the optical paths between the fiber lasers 18a, 18b and the directional couplers 16a, 16b. When the back propagating signals in the wavelength range of 1080–1100 nm are removed, the secondary signal illustrated in FIG. 3B does not appear.

Figure 4:
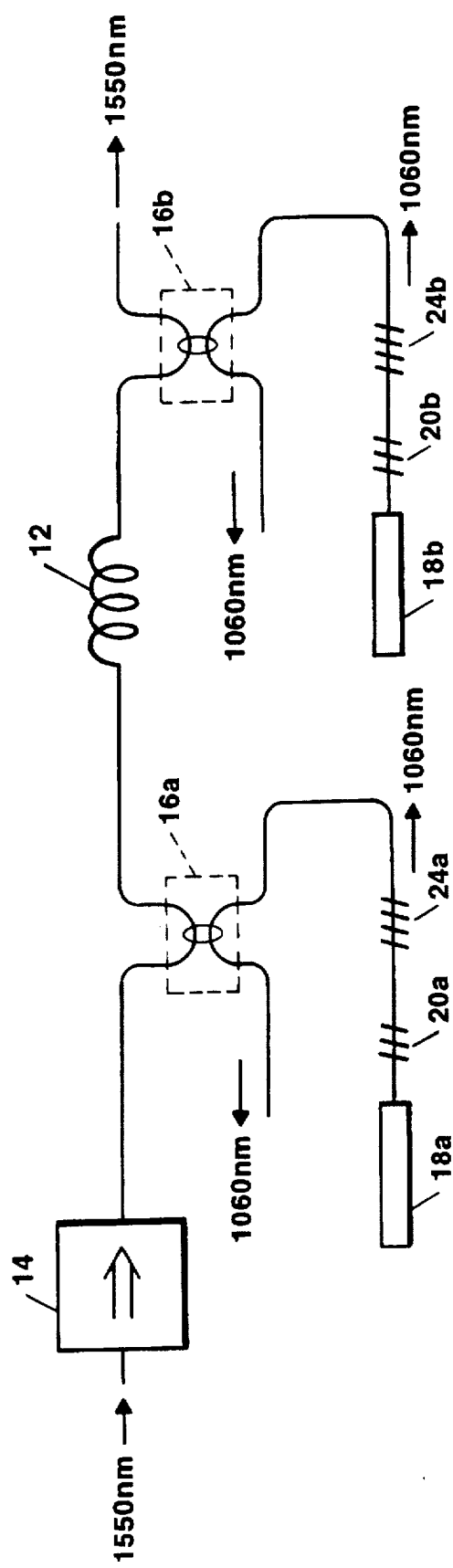
FIG. 4 is a schematic view of a fiber amplifier apparatus according to the present invention in which a long-period fiber grating is located in an optical path between the fiber amplifier and a fiber laser which pumps the amplifier.

The embodiment of FIG. 4 is similar to that of FIG. 1. An optical signal at 1550 nm is input through isolator 14 to Er/Yb fiber amplifier 12. The fiber amplifier is pumped by Yb fiber lasers 18a and 18b, which are coupled to the fiber amplifier 12 via directional couplers 16a, 16b, respectively. The construction of the FIG. 2 embodiment is identical to that of FIG. 1, except that long-period fiber Bragg gratings 24a, 24b are used to attenuate wavelengths in the range of 1090 nm in the path between the pumping lasers and the fiber amplifiers. Fiber gratings 24a, 24b are long period optical fiber Bragg gratings of known design, which attenuate optical energy in the wavelength range of 1080 nm to 1120 nm. Fiber grating 24a is located in the optical path between fiber laser 18a and directional coupler 16a, while fiber grating 24b is located in the optical path between fiber laser 18b and directional coupler 16b. The fiber gratings couple the backward propagating signal from the Er/Yb amplifier into cladding modes in the pump signal path. Thus, like the embodiment of FIG. 1, the apparatus of FIG. 2 provides pumping of the fiber amplifier at a wavelength of 1060 nm, while attenuating wavelengths in the range of 1080 nm to 1120 nm in the optical paths between the fiber lasers and the fiber amplifier.

Figure 5:
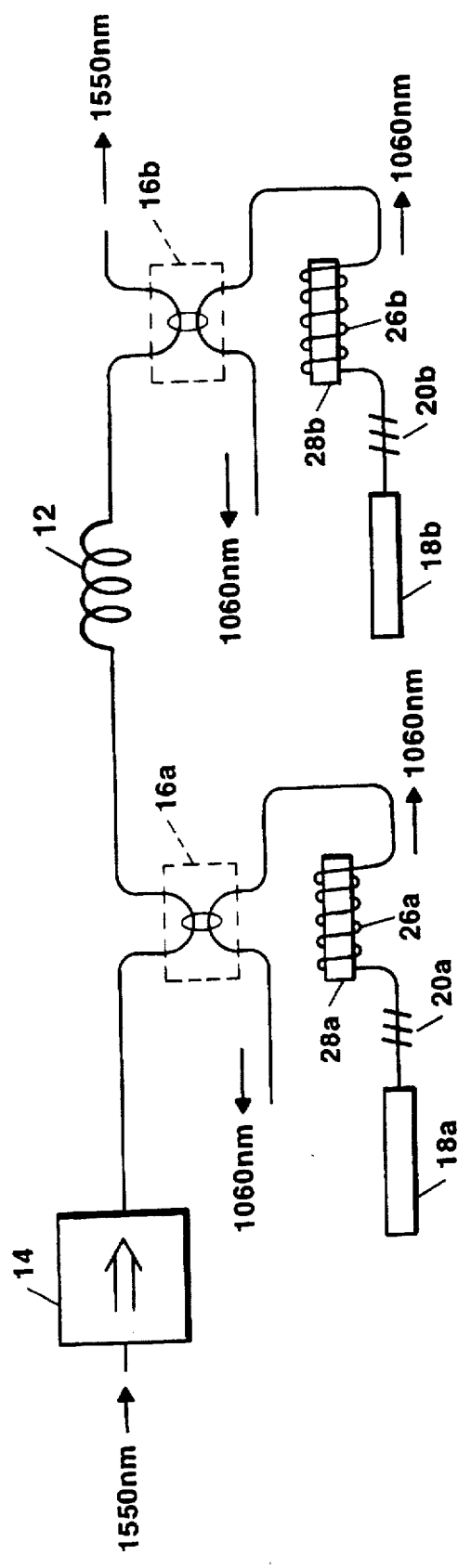
FIG. 5 is a schematic view of a fiber amplifier apparatus according to the present invention in which a fiber coil is located in an optical path between the fiber amplifier and a fiber laser which pumps the amplifier.

FIG. 5 shows another embodiment of the present invention which is similar to the embodiments of FIG. 1 and FIG.

4. An optical signal of 1550 nm is directed into Er/Yb fiber amplifier coil 12, passing first through isolator 14. The fiber amplifier is pumped by Yb fiber lasers 18a, 18b, via directional couplers 16a, 16b, respectively. However, unlike the embodiments of FIGS. 1 and 4, the desired wavelength attenuation in the optical paths between fiber laser 18a and directional coupler 16a, and fiber laser 18b and directional coupler 16b, is accomplished by bending the connecting fibers. Fiber coils 26a, 26b, are lengths of conventional silica fiber, wrapped about mandrels 28a, 28b, respectively. Each of the fiber coils 26a, 26b has a precise radius of curvature which, as is well-known, will cause a loss of optical energy above a characteristic wavelength which depends on the sharpness of the bend. In the embodiment of FIG. 5, the fiber coils 26a, 26b have a radius of curvature which gives them the characteristic of a high pass filter, such that wavelengths above approximately 1080 nm are attenuated. Thus, interaction between the fiber lasers 18a, 18b and the fiber amplifier at wavelengths above 1080 nm is reduced in accordance with the principles of the present invention.

While the invention has been shown and described with reference to a preferred embodiment thereof, it will be understood by those skilled in the art that various changes in form and detail may be made herein without departing from the spirit and scope of the invention as defined by the appended claims.

What is claimed is:

1. A fiber amplifier apparatus for amplifying an optical input signal, the apparatus comprising:

an optical fiber amplifier through which the optical input signal is transmitted;

a pumping source generating a pump signal in a first wavelength band which is coupled to the optical fiber amplifier via a pumping signal path, wherein the optical fiber amplifier generates a feedback signal in a second wavelength band substantially outside of the first wavelength band which travels along the pumping signal path toward the pumping source; and an optical attenuator located in the pumping signal path which significantly attenuates signals in the second wavelength band while causing negligible attenuation of signals in the first wavelength band.

2. Apparatus according to claim 1 wherein the optical fiber amplifier comprises a core doped with erbium and ytterbium.

3. Apparatus according to claim 1 wherein the pumping source comprises an ytterbium doped optical fiber.

4. Apparatus according to claim 1 wherein the optical attenuator attenuates signals in the wavelength range of 1080–1100 nm.

5. Apparatus according to claim 1 wherein the optical attenuator comprises a WDM coupler.

6. Apparatus according to claim 1 wherein the optical attenuator comprises an long period grating or blazed fiber grating.

7. Apparatus according to claim 1 wherein the optical attenuator comprises an optical fiber coil with a predetermined radius.

8. A fiber amplifier apparatus for amplifying an optical input signal, the apparatus comprising:

an optical fiber amplifier through which the optical input signal is transmitted;

a first pumping source generating a first pump signal in a first pumping wavelength band which is coupled to the optical fiber amplifier via first pumping signal path, wherein the optical fiber amplifier generates a first feedback signal in a first feedback wavelength band substantially outside of the first pumping wavelength band, the first feedback signal traveling along the first pumping signal path toward the first pumping source;

a first optical attenuator located in the pumping signal path which significantly attenuates signals in the first feedback wavelength band while causing negligible attenuation of signals in the second feedback wavelength band;

a second pumping source generating a second pump signal in a second pumping wavelength band which is coupled to the optical fiber amplifier via a second pumping signal path, wherein the optical fiber amplifier generates a second feedback signal in a second feedback wavelength band substantially outside of the second pumping wavelength band, the second feedback signal traveling along the second pumping signal path toward the second pumping source; and a second optical attenuator located in the second pumping signal path which significantly attenuates signals in the second feedback wavelength band while causing negligible attenuation of signals in the second feedback wavelength band.

9. Apparatus according to claim 8 wherein the first optical attenuator comprises a narrow-band WDM coupler.

10. Apparatus according to claim 8 wherein the first optical attenuator comprises an optical fiber Bragg grating.

11. Apparatus according to claim 8 wherein the first optical attenuator comprises an optical fiber coil having a bend radius sufficient to make the fiber act as a long wavelength filter.

12. Apparatus according to claim 8, wherein the optical input signal has a wavelength of approximately 1550 nm, the first pump signal has a wavelength of approximately 1060 nm and the first feedback signal has a wavelength of approximately 1090 nm.

13. Apparatus according to claim 8 wherein the second pumping source is substantially identical to the first pumping source.

14. A method for amplifying an optical input signal with an optical fiber amplifier, the method comprising the steps of:

A. transmitting the optical input signal through an optical fiber amplifier;

B. pumping the optical fiber amplifier with a pumping source which is coupled to the optical fiber amplifier via a pumping signal path and generates a pump signal in a first pumping wavelength band, wherein the optical fiber amplifier generates a feedback signal in a second wavelength band substantially outside of the first wavelength band which travels along the pumping signal path toward the fiber laser; and C. locating an optical attenuator in the pumping signal path, the optical attenuator significantly attenuating signals in the second wavelength band while causing negligible attenuation of signals in the first wavelength band.

15. A method according to claim 14 wherein step A comprises the step of:

A1. transmitting the optical input signal through an optical fiber amplifier which comprises a core doped with erbium and ytterbium.

16. A method according to claim 14 wherein step B comprises the step of:

B1. pumping the optical fiber amplifier with a pumping source which comprises an ytterbium doped optical fiber.

17. A method according to claim 14 wherein step C comprises the step of:

C1. locating an optical attenuator in the pumping signal path that attenuates signals in the wavelength range of 1080–1100 nm.

18. A method according to claim 14 wherein step C comprises the step of:

C2. locating a WDM coupler in the pumping signal path.

19. A method according to claim 14 wherein step C comprises the step of:

C3. locating an optical fiber diffraction grating in the pumping signal path.

20. A method according to claim 14 wherein step C comprises the step of:

C4. locating an optical fiber coil with a predetermined radius in the pumping signal path.

21. An optical fiber amplifier system comprising:

an optical fiber doped by at least one element for input signal amplification at at least a first wavelength;

a laser for pumping said optical fiber, said laser operating at at least a second wavelength, said second wavelength being at least partially absorbed by said at least one element, said first wavelength being a longer wavelength than said second wavelength; and optical attenuation means located in the optical path between said amplifying fiber and said laser, said attenuation means significantly attenuating wavelengths that are directed toward the laser and are longer than said second wavelength, while causing negligible attenuation of the second wavelength.

22. A system according to claim 21 wherein said laser is a fiber laser.

23. A system according to claim 22 wherein an optical fiber of said fiber laser is doped by at least one element that is also used to dope the optical fiber used for signal amplification.

24. A system according to claim 22 wherein said optical attenuation means attenuates light within a gain band of said fiber laser but only minimally attenuates said second wavelength.

25. A system according to claim 21 wherein said laser is a semiconductor laser.

* * * * *